United States Patent
Morooka

(10) Patent No.: US 7,905,978 B2
(45) Date of Patent: *Mar. 15, 2011

(54) METHOD OF PRODUCTION OF LOW-PERMEABLE RUBBER LAMINATE USING MULTI-LAYER FILM OF LOW-PERMEABLE RESIN

(75) Inventor: Naoyuki Morooka, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 139 days.

This patent is subject to a terminal disclaimer.

(21) Appl. No.: 12/446,490

(22) PCT Filed: Oct. 22, 2007

(86) PCT No.: PCT/JP2007/070966
§ 371 (c)(1),
(2), (4) Date: Apr. 21, 2009

(87) PCT Pub. No.: WO2008/053815
PCT Pub. Date: May 8, 2008

(65) Prior Publication Data
US 2010/0186888 A1     Jul. 29, 2010

(30) Foreign Application Priority Data
Nov. 2, 2006   (JP) .................. 2006-299203

(51) Int. Cl.
*B32B 38/10* (2006.01)

(52) U.S. Cl. .......... 156/247; 156/344; 156/308.2; 156/325; 156/238; 156/309.6; 152/510

(58) Field of Classification Search .......... 156/230, 156/308.2, 238, 241, 247, 344, 309.6; 152/203, 152/510

See application file for complete search history.

(56) References Cited

U.S. PATENT DOCUMENTS
5,992,486 A * 11/1999 Katsuki et al. ............... 152/510
6,079,465 A *  6/2000 Takeyama et al. ........... 152/510

FOREIGN PATENT DOCUMENTS
JP      1110779         4/1989
JP      8216610         8/1996
JP      2006159522      6/2006
JP      2007276267     10/2007
WO      WO-2007037541   4/2007

* cited by examiner

*Primary Examiner* — Khanh Nguyen
*Assistant Examiner* — Margaret Squalls
(74) *Attorney, Agent, or Firm* — Connolly Bove Lodge & Hutz LLP

(57) ABSTRACT

A method for easily producing a low permeable rubber laminate comprised of a thin film layer of a low permeable resin (B) laminated on a layer of a rubber composition (C) comprising:

laminating, on a low permeable multilayer film comprised of layer (A)/layer (B) of a laminated film of a layer of a polyolefin-based resin (A) and a thin film layer of a low permeable resin (B) having an air permeability coefficient, determined based on JIS K7126 at 30° C., of $0.5 \times 10^{-12}$ cc·cm/cm²·sec·cmHg or less and an average thickness $\epsilon$ of $0.05 < \epsilon < 20$ μm and having a peeling strength of the layer (A)/layer (B), determined based on JIS K6256 at 30° C., of less than 0.05N/mm for a pseudo-adhesive state, a layer of an unvulcanized rubber composition (C) in an order of layer (A)/layer (B)/layer (C) to bond the layer (B)/layer (C) so that the peeling strength, determined based on JIS K6256 at 30° C., of the layer (C) and layer (B) becomes 0.05N/mm or more and peeling off the layer (A) of the pseudo-adhesive body of the resultant laminate from the layer (B).

20 Claims, 1 Drawing Sheet

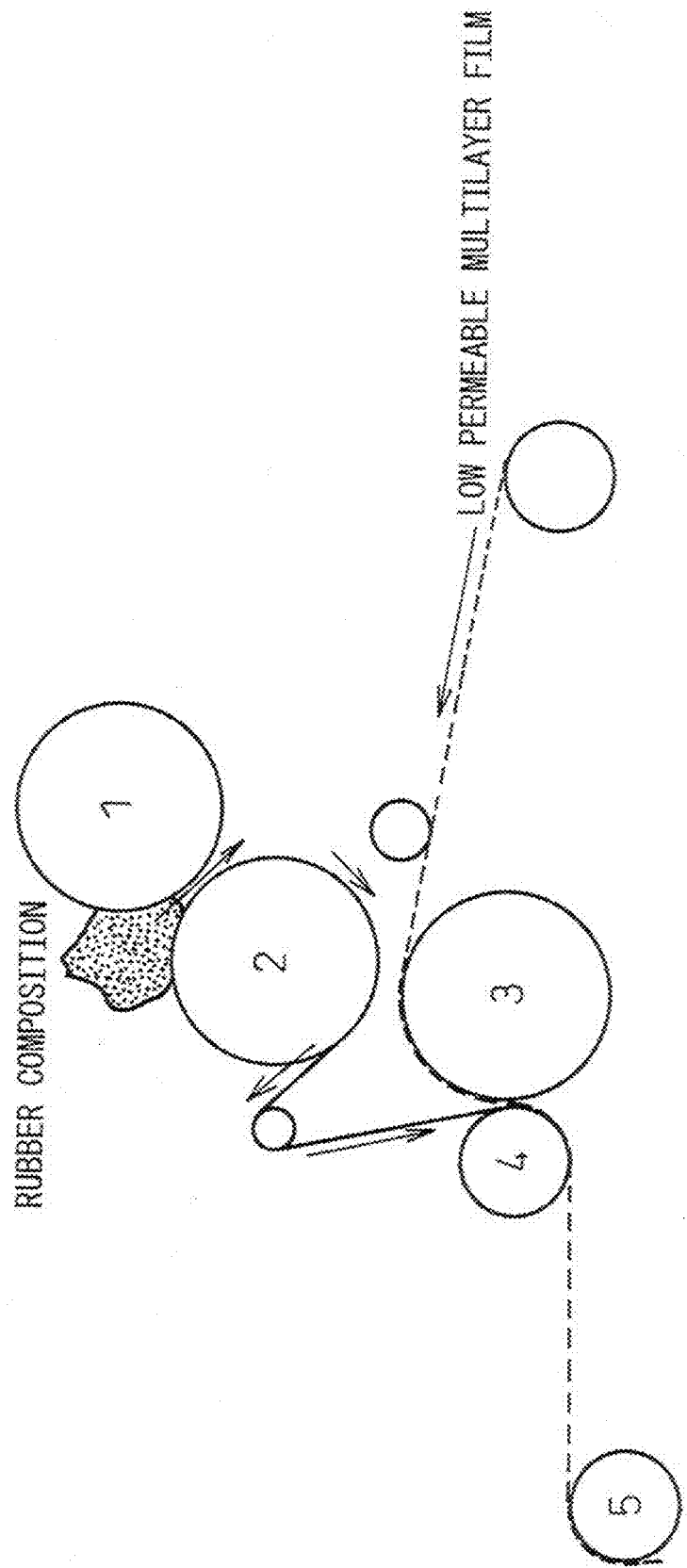

METHOD OF PRODUCTION OF LOW-PERMEABLE RUBBER LAMINATE USING MULTI-LAYER FILM OF LOW-PERMEABLE RESIN

CROSS REFERENCE TO RELATED APPLICATIONS

This application is a National Stage of PCT/JP2007/070966 filed Oct. 22, 2007 which in turn claims priority from Japanese Application 2006-299203 filed Nov. 2, 2006, the entire contents of which are incorporated herein by reference.

TECHNICAL FIELD

The present invention relates to a method for producing a low permeable rubber laminate using a multilayer film of a low permeable resin, more specifically relates to a method for producing a low permeable rubber laminate of a thin film of a low permeable resin and a diene-based rubber composition layer usable for tire applications.

BACKGROUND ART

A rubber composition for tire members is comprised of rubber, in which carbon black and a vulcanization agent, are compounded, and therefore, is high in viscosity. Further, at high temperatures, the rubber is cross-linked, and therefore, there are limits to the molding temperature. For example, it is difficult to coextrude a high molding temperature ethylene vinyl alcohol copolymer (EVOH) (molding temperature: 190 to 250° C.) to make a laminate of an EVOH thin film/rubber composition, and therefore a process of forming a single layer of a thin film of EVOH, followed by laminating with a rubber composition is not possible. No industrial method of production of an EVOH thin film/rubber composition laminate has yet been established. No prior art documents of such art are known.

DISCLOSURE OF THE INVENTION

Accordingly, an object of the present invention is to provide a method for the easy production of a uniform low permeable rubber laminate of a thin film of a low permeable resin an unvulcanized rubber composition.

In accordance with the present invention, there is provided a method for producing of a low permeable rubber laminate comprised of a thin film layer of a low permeable resin (B) laminated on a layer of a rubber composition (C) comprising:

(i) preparing a low permeable multilayer film of (A) a layer of a polyolefin-based resin and (B) a thin film layer of a low permeable resin having an air permeability coefficient, determined based on JIS K7126 at 30° C., of $0.5 \times 10^{-12}$ cc·cm/cm$^2$·sec·cmHg or less and an average thickness ε of $0.05 < \epsilon < 20$ μm, wherein the layer (A)/layer (B) are in a pseudo-adhesive state and the layer (A)/layer (B) have a peeling strength, determined based on JIS K6256 at 30° C., of less than 0.05N/mm, (ii) laminating, on the low permeable multilayer film, a layer of an unvulcanized rubber composition (C) in an order of layer (A)/layer (B)/layer (C) to bond the layer (B)/layer (C) so that the peeling strength of the layer (C) and layer (B), determined based on JIS K6256 at 30° C., becomes 0.05N/mm or more, and (iii) peeling off the layer (A) of the pseudo-adhesive state of the resultant laminate from the layer (B).

In accordance with the present invention, there is further provided a method for producing a low permeable rubber laminate comprised of a thin film layer of a low permeable resin (B) laminated on a layer of a rubber composition (C) comprising:

(i) preparing a low permeable multilayer film of a layer of a polyolefin-based resin (A) and a thin film layer of a low permeable resin (B) having an air permeability coefficient, determined based on JIS K7126 at 30° C., $0.5 \times 10^{-12}$ cc·cm/cm$^2$·sec·cmHg or less and an average thickness ε of $0.05 < \epsilon < 20$ μm and a layer of a tackifier/adhesive (D) laminated in an order of the layer (A)/layer (B)/layer (D), wherein the layer (A)/layer (B) are in a pseudo-adhesive state and the layer (A)/layer (B) have a peeling strength, determined based on JIS K6256 at 30° C., of less than 0.05N/mm, (ii) laminating, on the low permeable multilayer film, a layer of an unvulcanized rubber composition (C) in an order of layer (A)/layer (B)/layer (D)/layer (C) to bond the layer (D)/layer (C) so that the peeling strength of the layer (C) and layer (D), determined based on JIS K6256 at 30° C., becomes 0.05N/mm or more, and (iii) peeling off the layer (A) of the pseudo-adhesive state of the resultant laminate.

According to the present invention, a pseudo-adhesive layer of a polyolefin resin (A) is laminated in advance on a thin film layer of EVOH or another low permeable resin (B) and is made to bond with a layer of a rubber composition (C) directly or through a layer of a tackifier/adhesive (D) (i.e., layer (A) peeled off later), and therefore, it is possible to simply laminate a thin, poor processability layer (B) on the rubber composition (C). This is extremely convenient for producing an inner liner for a tire and enables decrease in the tire weight and material cost (MCD).

BRIEF DESCRIPTION OF THE DRAWINGS

FIG. 1 is a view schematically showing a calendar roll machine used in the Examples of the Description.

BEST MODE FOR CARRYING OUT THE INVENTION

The inventors engaged in research to solve the above problems and, as a result, found that by making a thin film layer of a low permeable resin (B) pseudo-adhere to a polyolefin resin (A) to obtain a low permeable multilayer film (A)/(B), followed by laminating with a rubber composition (C) directly or through a tackifier/adhesive layer (D), it is possible to obtain a laminate of the layer (A)/layer (B)/layer (C) or the layer (A)/layer (B)/layer (D)/layer (C) and that by peeling the layer (A) therefrom, we succeeded in uniformly preparing a desired low permeable laminate of a layer (B)/layer (C) or layer (B)/layer (D)/layer (C).

In the first aspect of the present invention, by laminating a laminated film of layer (A)/layer (B) comprised of a layer of a polyolefin-based resin (A) and a thin film layer of a low permeable resin having an air permeability coefficient, determined based on JIS K7126 at 30° C., of $0.5 \times 10^{-12}$ cc·cm/cm$^2$·sec·cmHg or less, preferably 0.1 cc·cm/cm$^2$·sec·cmHg or less, and an average thickness ε of $0.05 < \epsilon < 20$ μm, preferably 1 to 10 μm, laminated in a pseudo-adhesive state, the low permeable multilayer film (A)/(B) having a peeling strength of the layer (A)/layer (B), determined based on JIS K6256 at 30° C., of less than 0.05N/mm, preferably 0.01N/mm or less and having a peeling strength of a layer of an unvulcanized rubber composition (C) and the layer (B), determined based on JIS K6256 at 30° C., of 0.05N/mm or more, preferably 0.05N/mm to 5N/mm, with the layer of the rubber composition (C) in the order of (A)/(B)/(C), bonding the (B)/(C) layers, then peeling off the pseudo-adhesive state layer (A) by a general method (e.g., using a surface treated takeup roll with tackiness with the layer (A), pressing (B)/(C) closely together, then taking up only the layer (A) while pressing the layer (A) against the takeup roll), it is possible to produce a low permeable rubber laminate comprised of a low permeable resin (B) thin film layer laminated on a rubber composition layer (C).

According to the second aspect of the present invention, by laminating, on the thin film layer of a polyolefin-based resin (A) layer and low permeable resin (B) at the layer (B) side a layer of a tackifier/adhesive (D) in the order of the layer (A)/layer (B)/layer (D) to obtain a low permeable multilayer film, laminating the low permeable multilayer film (i.e., layer (A)/layer (B)) and the rubber composition (C) in the order of the layer (A)/layer (B)/layer (D)/layer (C) so that the layer (A)/layer (B) are in a pseudo-adhesive state, as explained above, and having a peeling strength of (A)/(B) (Note: determination method as explained above) of less than 0.05N/mm and further having a peeling strength of a layer of an unvulcanized rubber composition (C) and a layer (D), determined based on JIS K6256 at 30° C., of 0.05N/mm or more, preferably 0.05 to 5N/mm, pressing the layer (D)/layer (C) together, then peeling off the pseudo-adhesive state layer (A) by a general method, as explained above, it is possible to produce a low permeable rubber laminate comprised of a low permeable resin (B) thin film layer laminated on a rubber composition layer (C) via a tackifier/adhesive layer (D).

In this way, according to the present invention, it is possible to bond a thin film layer of the low permeable resin (B) with a layer of a rubber composition (C) before vulcanization in a state pseudo-adhered with a layer of the polyolefin resin (A) either directly or via a tackifier/adhesive (D) layer, and therefore, it is possible to uniformly and simply laminate a thin film of a low permeable resin (B) before vulcanization on the layer of a rubber composition (C) either directly or via a tackifier/adhesive layer (D), without the need for coextrusion of a thin film of the low permeable resin (B) or formation as a single layer for lamination. The low permeable multilayer film thus obtained, for example, can use the thin film layer of the low permeable resin (B), as an inner sheet of a pneumatic tire. The layer of the rubber composition (C) can be made to function, as a protective layer of the thin film layer of the low permeable resin (B) or moisture preventing layer for suppressing the decrease in gas barrier property of the layer (B) due to the humidity.

According to the present invention, in the first and second aspects, by further laminating a rubber composition (C'), which is the same as or different from the rubber composition (C) at the low permeable multilayer film on the low permeable resin layer (B) side by a general method, it is possible to obtain a low permeable rubber laminate of a structure of thin film layer of the low permeable resin (B), sandwiched with the rubber compositions (C) and (C') (Note: the rubber compositions (C) and (C') may be the same or different).

The polyolefin-based resin (A) usable in the present invention is not particularly limited so long as satisfying the peeling strength with (B). Specifically, while not limited to these, for example, high density polyethylene (HDPE), low density polyethylene (LDPE), polypropylene (PP), poly(4-methyl-1-pentene), etc. may be mentioned.

The low permeable resin (B) usable in the present invention is not particularly limited so long as satisfying the air permeability coefficient (note: the larger this value, the less the desired gas barrier property can be obtained, so the less preferable) and satisfying the (A)/(B) peeling strength and the (B)/(C) peeling strength, but specifically it is preferable to use a composition mainly comprised of an ethylene-vinyl alcohol copolymer. It is also possible to use gas barrier property resin such as a polyvinyl alcohol (PVA), polyvinylidene chloride (PVDC).

The low permeable multilayer film of the polyolefin-based resin (A) and low permeable resin (B) according to the present invention can be prepared by multilayer extrusion, inflation molding, etc. of the resins (A) and (B) by an ordinary method. The specific conditions are not particularly limited. A general method may be used for the production.

As the rubber compositions (C) and (C') usable in the present invention, it is possible to use any rubber usable for a pneumatic tire. Specifically, while not limited to these, natural rubber, polybutadiene rubber, styrene-butadiene copolymer rubber, polyisoprene, butyl rubber, halogenated butyl rubber, ethylene propylene rubber, etc. may be mentioned. Note that the rubber composition may contain carbon black, silica, or another reinforcing agent (filler), a vulcanization or cross-linking agent, vulcanization or cross-linking accelerator, various types of oils, an antioxidant, a plasticizer, and other various types of additives generally included for tire use or other rubber composition use. These additives may be mixed by a general method to obtain a composition for use for vulcanization or cross-linking. The compounding amounts of these additives may be made the conventional general compounding amounts so long as to the object of the present invention is not adversely affected.

The tackifier/adhesive (D) usable in the present invention is not particularly limited so long as the peeling strength as the rubber composition (C) is satisfied. For example, a styrene-butadiene-styrene copolymer (SBS) having an epoxy group or anhydrous maleic acid group containing a terpene resin, terpene phenol resin, aromatic terpene resin, rosin-ester based resin, etc. may be mentioned. Note that the layers of these tackifiers/adhesives (D) may include a general vulcanization accelerator (e.g., thiazole-based vulcanization accelerator, thiuram-based vulcanization accelerator or sulfenamide-based vulcanization accelerator) or a vulcanization acceleration aid (e.g., zinc oxide, stearic acid or zinc stearate) and further a general use additive.

The resins usable in the present invention may have suitably blended into them any additives generally compounded, for example, anti-oxidants, antiaging agents, coloring agents, plasticizers, fillers, processing aids, etc.

EXAMPLES

Examples will now be used to further explain the present invention, but the scope of the present invention is not limited to these Examples.

Examples 1 to 6 and Comparative Examples 1 to 3

Preparation of Samples

Based on each of the compositions shown in Table I, the materials were molded using T-die molding machines, equipped with three-layer or two-layer dies under extrusion temperatures of 240° C. to prepare (A)/(B) and (A)/(B)/(D) low permeable multilayer films. The materials used are shown in Table II, Table III and Table IV.

The various test methods shown in the Tables were as follows:

Method of Determination of Air Permeability Coefficient of Film (Gas Permeability Test Method)

The determination was conducted based on JIS K7126 "Gas Permeability Test Method of Plastic Film and Sheet". The test determines the permeabilities of all sorts of gases in a specified range of a test system used. The permeability was found by the Method A of holding one side separated by the test sample (i.e., low pressure side) in a vacuum while introducing a test gas to the other side (i.e., high pressure side) and measuring the gas permeability by the increase in pressure at the low pressure side (i.e., differential pressure method). Here, the gas permeability coefficient was calculated from the found gas permeability.

Test sample: film prepared in each example used
Test gas: air ($N_2:O_2=8:2$)
Test temperature: 30° C.
Method of Determination of Peeling Strength
Determination of Peeling Strength of (A)/(B)

Using a T-die molding machine equipped with a two-layer die, a sheet comprised of two layers of a polyolefin-based resin (A) and a low permeable resin (B) was prepared and determined for peeling strength between (A)/(B), based on JIS K6256 at 30° C.

Determination of Peeling Strength Between (B)/(D)

Using the T-die molding machine, a single layer low permeable resin (B) sheet was prepared, laminated with a rubber composition (D), then pressed by a pressure of 0.5 kg/cm$^2$ or more to bond the (B)/(D). This laminate was determined for peeling strength between (B)/(D), based on JIS K6256 at 30° C.

Determination of Peeling Strength Between (C)/(D)

Using a T-die molding machine equipped with a two-layer die, a sheet comprised of the two layers of a low permeable resin (B) and tackifier/adhesive (C) was prepared, laminated with a rubber composition (D), then pressed at room temperature by a pressure of 0.5 kg/cm$^2$ or more to bond the (C)/(D). The laminate was determined for peeling strength between (C)/(D), based on JIS K6256 at 30° C.

Calendar Rolled Laminate of Rubber Composition/Low Permeability Multilayer Film

Using the calendar roll press shown in FIG. 1, a rubber composition was rolled between a roll 1/roll 2 to obtain a sheet shape. This was press bonded with a previously prepared low permeable multilayer film between the roll 3/roll 4 in FIG. 1 by a pressure of 0.5 kg/cm$^2$ or more, then the thermoplastic resin layer (A) was peeled off, while taking it up by a roll 5, to thereby prepare a laminate of the rubber composition (C)/low permeable resin (B).

Good: Cases where the low permeable resin (B) could be laminated on the rubber composition (C), without tearing or blistering were evaluated as "Good".

Poor: Cases where, when peeling off the pseudo-adhered (A) layer, blistering or tearing at the interface of the low permeable resin (B) layer/rubber composition (C) layer or the tackifier/adhesive (D) layer/rubber composition (C) layer occurred or, when peeling off the layer (A), the low permeable resin (B) layer tore, were evaluated as "Poor".

TABLE I

| Composition of low permeable multilayer film (A)/(B) or (A)/(B)/(D) | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Polyolefin resin (A) layer (thickness/μm) | LDPE 40 | LDPE 40 | HDPE 40 | PP 40 | 4MIP 40 | LDPE 40 | LDPE 40 | LDPE 40 | LDPE 40 |
| Low permeable resin (B) layer (thickness/μm) | EV-01 2 | EV-01 2 | EV-01 2 | EV-01 2 | EV-01 2 | EV-02 5 | EV-01 2 | EV-01 2 | EV-02 5 |
| Adhesive (D) layer (thickness/μm) | — | A-01 5 | A-01 5 | A-01 5 | A-01 5 | A-01 5 | — | A-02 5 | A-02 5 |
| Rubber composition (C) layer (thickness/μm) | G-01 500 | G-01 500 | G-01 500 | G-01 500 | G-01 500 | G-01 500 | G-02 500 | G-01 500 | G-01 500 |
| (A)/(B) peeling strength N/mm | <0.005 | <0.005 | <0.005 | <0.005 | <0.005 | <0.005 | <0.005 | <0.005 | <0.005 |
| (B)/(C) or (D)/(C) peeling strength N/mm | 0.2 | >0.5 (D) material tears | >0.5 (D) material tears | >0.5 (D) material tears | >0.5 (D) material tears | >0.5 (D) material tears | 0.02 | 0.01 | 0.01 |
| Calendar rolled rubber composition/low permeable multilayer film laminate | Good | Good | Good | Good | Good | Good | Poor-Peeling at interface of (B)/(C) when peeling off (A) | Poor-Peeling at interface of (C)/(D) when peeling off (A) | Poor-Peeling at interface of (C)/(D) when peeling off (A) |

Footnotes of Table I
LDPE: Novatec LD LF128 made by Japan Polyethylene Corporation
HDPE: Novatec HD HB233R made by Japan Polyethylene Corporation
PP: PP E-333GV made by Idemitsu Petrochemicals
4MIP: TPX RT31 made by Mitsui Chemicals
EV-01: See Table II.
EV-02: See Table II.
A-01: See Table IV.
A-02: See Table IV.

Formulations of Ethylene Vinyl Alcohol Compositions (B) EV01 and EV02

In each of the formulations of Table II, the material pellets were charged into a twin-screw kneader (TEX44, made by Japan Steel Works) and melt mixed. The mixed material was continuously discharged from an extruder in strands, which were cut by a water-cooled cutter to obtain a pellet-shaped ethylene-vinyl alcohol composition.

TABLE II

| Formulations of Ethylene Vinyl Alcohol Composition (B) | | |
|---|---|---|
| | EV01 | EV02 |
| Formulation (parts by weight) | | |
| L171B | 70 | 42 |
| 1030B | 30 | 18 |
| MP-0620 | | 40 |

TABLE II-continued

Formulations of Ethylene Vinyl Alcohol Composition (B)

|  | EV01 | EV02 |
|---|---|---|
| Air permeability coefficient (30° C.) × $10^{-12}$ cc · cm/cm² · sec · cmHg | 0.02 | 0.05 |

Footnotes of Table II
L171B: Eval L171B made by Kuraray
1030B: UBE Nylon 1030B made by Ube Industries
MP-0620: Tafmer MP-0620 made by Mitsui Chemical Formulations of Rubber Composition (C)

In each of the formulations shown in Table III, the materials were mixed in a 16L Banbury mixer for 4 to 5 minutes to obtain a rubber composition.

TABLE III

Formulations of Rubber Composition (C)

| Formulation (parts by weight) | G-01 | G-02 |
|---|---|---|
| NR | 50 | — |
| SBR | — | 50 |
| Br-IIR | 50 | 50 |
| CB | 55 | 55 |
| OZ | 2 | — |
| DM | — | 1 |
| Stearic acid | 1 | 1 |
| Zinc white | 5 | 5 |
| Sulfur | 2 | 1 |

NR: SIR20 made by PT. NUSIRA
SBR: Nipol 1502 made by Nippon Zeon
Br-IIR: BROMOBUTYL X2 made by LANXESS RUBBER N.V.
OB: Niteron #GN made by NSC Chemical Carbon
OZ: Noccelar CZ made by Ouchi Shinko Chemical Industrial
DM: Sanceler DM-PO made by Sanshin Chemical Industry
Stearic acid: Beads Stearic Acid YR made by NOF Corporation
Zinc White: Zinc White No. 3 made by Seido Chemical Industry Formulation of Adhesives (D) A-01 and A-02

In each of the formulations shown in Table IV, the material pellets and compounding agents were charged into a twin-screw kneader (TEX44, made by Japan Steel Works) and melt mixed at 120° C. The mixed material was continuous discharged from an extruder in strands which were cut by a water-cooled cutter to thereby obtain the pellet-shaped adhesive (D).

TABLE IV

Formulation of Tackifier/Adhesive (D)

| Formulation (parts by weight) | A-01 | A-02 |
|---|---|---|
| ESBS*[1] | 100 | 100 |
| Zinc oxide*[2] | 5 | 5 |
| Stearic acid *[3] | 1 | 1 |
| Vulcanization accelerator *[4] | 3 | 3 |
| Tackifier*[5] | 30 | — |

Footnotes of Table IV
ESBS: Epofriend AT501 made by Daicel Chemical
Zinc oxide: Zinc White No. 3 made by Seido Chemical Industry
Stearic acid: Beads Stearic Acid YR made by NOF Corporation
Vulcanization accelerator: Noccelar TOT-N made by Ouchi Shinko Chemical Industrial
Tackifier YR Resin D105: YS Resin D105 made by Yasuhara Chemical

INDUSTRIAL APPLICABILITY

According to the present invention, a pseudo-adhesive layer of a polyolefin resin (A) is laminated, in advance, with a thin film layer (or film) of a low permeable resin (B) directly or through a layer of a tackifier/adhesive (D) and is bonded with a layer of a rubber composition (C), and therefore, it is possible to simply and easily bond (or laminate) the thin film, poor processability layer (B) with the rubber composition (C). This is extremely convenient for producing an inner liner for tire and enables lighter weight of the tire and MCD.

The invention claimed is:

1. A method for producing a low permeable rubber laminate comprised of a thin film layer of a low permeable resin (B) laminated on a layer of a rubber composition (C) comprising:
    (i) preparing a low permeable multilayer film of (A) a layer of a polyolefin-based resin and (B) a thin film layer of a low permeable resin having an air permeability coefficient, determined based on JIS K7126 at 30° C., of $0.5 \times 10^{-12}$ cc·cm/cm²·sec·cmHg or less and an average thickness ϵ of 0.05<ϵ<20 μm, wherein the layer (A)/layer (B) are in a pseudo-adhesive state and the layer (A)/layer (B) have a peeling strength, determined based on JIS K6256 at 30° C., of less than 0.05N/mm,
    (ii) laminating, on said low permeable multilayer film, a layer of an unvulcanized rubber composition (C) in an order of layer (A)/layer (B)/layer (C) to bond the layer (B)/layer (C) so that the peeling strength, determined based on JIS K6256 at 30° C., of the layer (C) and layer (B) becomes 0.05N/mm or more, and
    (iii) peeling off the layer (A) of the pseudo-adhesive state of the resultant laminate from the layer (B).

2. A method for producing a low permeable rubber laminate comprised of a thin film layer of a low permeable resin (B) laminated on a layer of a rubber composition (C) comprising
    (i) preparing a low permeable multilayer film of (A) a layer of a polyolefin-based resin and (B) a thin film layer of a low permeable resin having an air permeability coefficient, determined based on JIS K7126 at 30° C., of $0.5 \times 10^{-12}$ cc·cm/cm²·sec·cmHg or less and an average thickness ϵ of 0.05≦ϵ≦20 μm and (D) a layer of a tackifier/adhesive laminated in an order of the layer (A)/layer (B)/layer (D), wherein the layer (A)/layer (B) are in a pseudo-adhesive state and the layer (A)/layer (B) have a peeling strength, determined based on JIS K6256 at 30° C., of less than 0.05N/mm,
    (ii) laminating, on said low permeable multilayer film, a layer of an unvulcanized rubber composition (C) in an order of layer (A)/layer (B)/layer (D)/layer (C) to bond the layer (D)/layer (C) so that the peeling strength, determined based on JIS K6256 at 30° C., of the layer (C) and layer (D) becomes 0.05N/mm or more, and
    (iii) peeling off the layer (A) of the pseudo-adhesive state of the resultant laminate.

3. A method for producing as claimed in claim 1 further comprising laminating an unvulcanized rubber composition (C') on said low permeable rubber laminate at the low permeable resin (B) layer side so as to produce a low permeable rubber laminate with a thin film layer of the low permeable resin (B) sandwiched between layers of rubber compositions (C) and (C').

4. A method for producing a low permeable rubber laminate as claimed in claim 1, wherein the polyolefin-based resin (A) is at least one resin selected from the group consisting of a high density polyethylene (HDPE), low density polyethylene (LDPE), polypropylene (PP) and poly(4-methyl-1-pentene).

5. A method for producing a low permeable rubber laminate as claimed in claim 2, wherein the tackifier/adhesive (D)

includes at least one component of a vulcanization accelerator and a vulcanization acceleration aid respectively.

6. A method for producing a low permeable rubber laminate as claimed in claim 2, wherein the tackifier/adhesive (D) includes at least one resin selected from the group consisting of terpene resins, terpene phenol resins, aromatic terpene resins and rosin ester based resins.

7. A method for producing a low permeable rubber laminate as claimed in claim 2, wherein the tackifier/adhesive (D) includes at least one styrene-butadiene-styrene copolymer (SBS) having an epoxy group or anhydrous maleic acid group.

8. A method for producing a low permeable rubber laminate as claimed in claim 1, wherein the low permeable resin (B) includes, as a main component, a composition comprising an ethylene-vinyl alcohol copolymer.

9. A method for producing a low permeable rubber laminate as claimed in claim 1, wherein the low permeable multilayer film is produced by multilayer extrusion or inflation molding process.

10. A method for producing as claimed in claim 2 further comprising laminating an unvulcanized rubber composition (C') on said low permeable rubber laminate at the low permeable resin (B) layer side so as to produce a low permeable rubber laminate with a thin film layer of the low permeable resin (B) sandwiched between layers of rubber compositions (C) and (C').

11. A method for producing a low permeable rubber laminate as claimed in claim 2, wherein the polyolefin-based resin (A) is at least one resin selected from the group consisting of a high density polyethylene (HDPE), low density polyethylene (LDPE), polypropylene (PP) and poly(4-methyl-1-pentene).

12. A method for producing a low permeable rubber laminate as claimed in claim 3, wherein the polyolefin-based resin (A) is at least one resin selected from the group consisting of a high density polyethylene (HDPE), low density polyethylene (LDPE), polypropylene (PP) and poly(4-methyl-1-pentene).

13. A method for producing a low permeable rubber laminate as claimed in claim 10, wherein the tackifier/adhesive (D) includes at least one component of a vulcanization accelerator and a vulcanization acceleration aid respectively.

14. A method for producing a low permeable rubber laminate as claimed in claim 11, wherein the tackifier/adhesive (D) includes at least one component of a vulcanization accelerator and a vulcanization acceleration aid respectively.

15. A method for producing a low permeable rubber laminate as claimed in claim 10, wherein the tackifier/adhesive (D) includes at least one resin selected from the group consisting of terpene resins, terpene phenol resins, aromatic terpene resins and rosin ester based resins.

16. A method for producing a low permeable rubber laminate as claimed in claim 11, wherein the tackifier/adhesive (D) includes at least one resin selected from the group consisting of terpene resins, terpene phenol resins, aromatic terpene resins and rosin ester based resins.

17. A method for producing a low permeable rubber laminate as claimed in claim 5, wherein the tackifier/adhesive (D) includes at least one resin selected from the group consisting of terpene resins, terpene phenol resins, aromatic terpene resins and rosin ester based resins.

18. A method for producing a low permeable rubber laminate as claimed in claim 10, wherein the tackifier/adhesive (D) includes at least one styrene-butadiene-styrene copolymer (SBS) having an epoxy group or anhydrous maleic acid group.

19. A method for producing a low permeable rubber laminate as claimed in claim 11, wherein the tackifier/adhesive (D) includes at least one styrene-butadiene-styrene copolymer (SBS) having an epoxy group or anhydrous maleic acid group.

20. A method for producing a low permeable rubber laminate as claimed in claim 5, wherein the tackifier/adhesive (D) includes at least one styrene-butadiene-styrene copolymer (SBS) having an epoxy group or anhydrous maleic acid group.

\* \* \* \* \*